W. E. LAWRENCE.
Curry-Combs.

No. 157,010. Patented Nov. 17, 1874.

Witnesses,
Chas. H. Smith
Harold Serrell

Inventor
William E. Lawrence,
per Lemuel W. Serrell
atty.

UNITED STATES PATENT OFFICE.

WILLIAM E. LAWRENCE, OF NEW YORK, N. Y., ASSIGNOR TO THE LAWRENCE CURRY-COMB COMPANY, OF SAME PLACE.

IMPROVEMENT IN CURRY-COMBS.

Specification forming part of Letters Patent No. 157,010, dated November 17, 1874; application filed June 30, 1874.

*To all whom it may concern:*

Be it known that I, WILLIAM E. LAWRENCE, of the city and State of New York, have invented an Improvement in Curry-Combs, of which the following is a specification:

In Letters Patent No. 150,585, granted to me May 4, 1874, a curry-comb is shown with metallic trough-shaped plates, with teeth on one edge of each trough, and these are united by end knocker-plates; and the wires that pass through such comb-plates extend into the handle, and are turned over at their front ends; and a separate brace is used between the front comb-plate and the handle.

My present invention is an improvement upon the said patent, and is made for the purpose of strengthening the attachment of the comb to the handle, and at the same time for forming a back loop of wire that can be grasped by the hand in connection with or in place of seizing the wooden handle whenever most convenient in using the curry-comb. The wires that pass from the handle through the curry-comb plates are returned to the handle at a sufficient distance from the back to form a wire-loop handle, and at the same time strengthen the attachment of the comb-plates to the handle.

Figure 1:
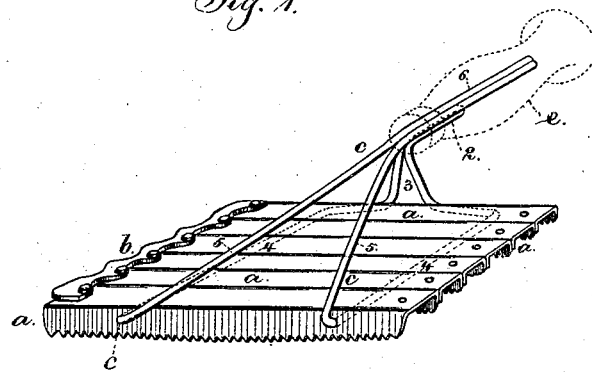
Figure 2:
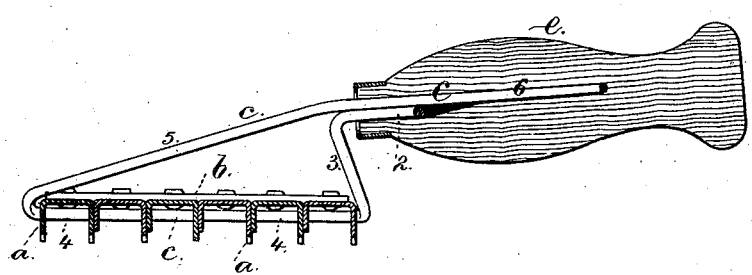

In the drawing, Figure 1 is a perspective view of the curry-comb with one of the knockers removed; and Fig. 2 is a vertical longitudinal section of the same.

*a a* are the comb-plates, formed as sheet-metal troughs, and these are connected at their ends by the knockers *b b*. The handle-wire *c* is bent double at 2; is spread at 3, and then passes in two parallel lines at 4 through holes in the comb-plates *a*, and then such wires are returned above the back, as at 5, and their ends 6 form tines to be inserted into the wooden handle *e*. The double portion 2 of this wire also passes into the wooden handle; and it is preferable to retain the wires firmly within a pair of metal jaws that are made to receive them while the handle is being driven upon such wires. The portions 5 of the wire *c* form loops that may be grasped in connection with or instead of the handle *e*; and this is very convenient in using the comb on some parts of the animal's body, because the hand is behind the comb-plates, and the handle *e* can stand in either direction, as may be most convenient. In cases where the knockers or welts *b* at the ends of the comb-plates are adapted to receive the handle-wire, I return such wires to the handle behind the comb-plates, and form the braces and additional grasping-handles, as aforesaid.

I claim as my invention—

The curry-comb made with the wires *c* running transversely to the comb-plates, and returning behind the same to the handle *e*, substantially as and for the purposes set forth.

Signed by me this 18th day of June, A. D. 1874.

WM. E. LAWRENCE.

Witnesses:
    GEO. T. PINCKNEY,
    CHAS. H. SMITH.